No. 871,316. PATENTED NOV. 19, 1907.
F. G. ALVORD.
THREE OR FOUR HORSE HITCH.
APPLICATION FILED MAY 16, 1907.
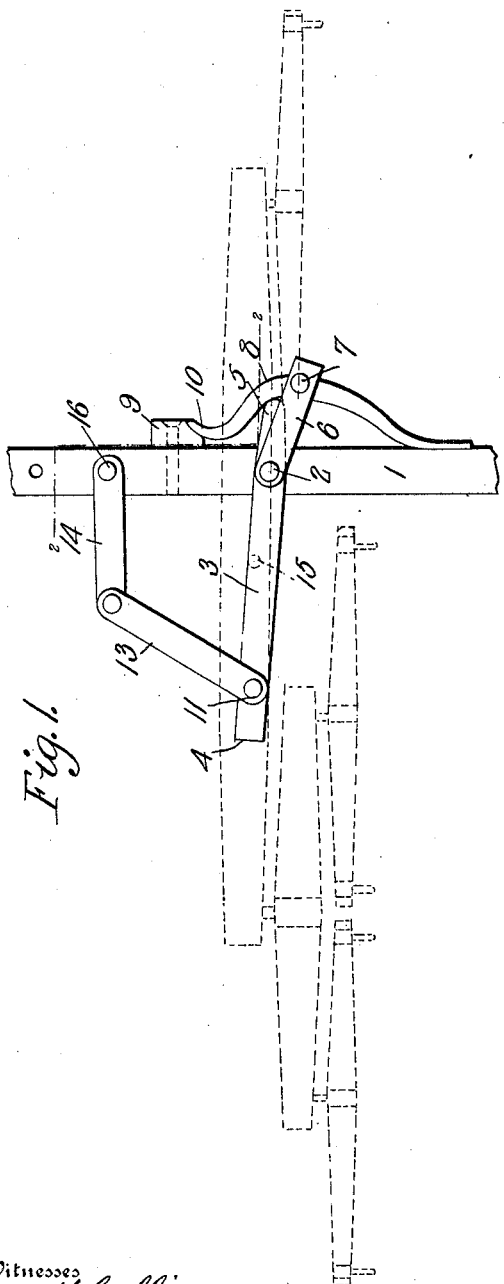
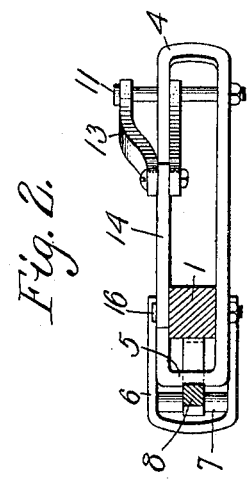
Witnesses
Jos. F. Collins.
A. C. Knight.
Inventor
Franklin G. Alvord.
By Jno. R. Adams
Attorney
THE NORRIS PETERS CO., WASHINGTON, D. C.

UNITED STATES PATENT OFFICE.

FRANKLIN G. ALVORD, OF ESTELLE, OKLAHOMA TERRITORY.

THREE OR FOUR HORSE HITCH.

No. 871,316.        Specification of Letters Patent.        Patented Nov. 19, 1907.

Application filed May 16, 1907. Serial No. 374,088.

*To all whom it may concern:*

Be it known that I, FRANKLIN G. ALVORD, a citizen of the United States, residing at Estelle, in the county of Woods, Territory of Oklahoma, have invented certain new and useful Improvements in Three or Four Horse Hitches, of which the following is a specification.

The present invention relates to hitching devices for farming machines and implements and in particular to that class of hitching devices in which it is desired to equalize the draft of animals not symmetrically disposed with reference to the machine being hauled.

The particular object of my invention, is to reduce to a minimum, the undesirable effects of side draft.

A further object is to provide a more simple and efficient device for equalizing the draft on the machine.

Other and further objects will appear in the following description and will be more particularly pointed out in the appended claims.

The invention is illustrated in the accompanying drawings in which,

Figure 1 is a plan view of the hitch complete; and Fig. 2 is a rear elevation of the same with parts broken away on the line 2—2, Fig. 1.

In the use of three or four horses to a plow, it is desirable to have one of the horses walk in the furrow while the others walk in the stubble, or if they be used with a harvesting machine, it is desirable to have the forward strain of the horses applied to a greater degree on one side than on the other in order to avoid trampling the grain which is being cut. It thus becomes necessary to use some device for evening up the unequally distributed draft exerted by the several horses, and to nullify, as far as possible, the bad effects of side draft. These results I accomplish by means of the structure disclosed in the following description.

Referring now to the drawings, 1 is the tongue of the vehicle, provided at 2 with a bolt or pivot about which oscillates the primary lever 3. This lever 3 is pivoted at 2 at such a point in its length, as to provide a long arm 4 and a short arm 5, the latter impinging on the spring 8. Also carried by the pivot 2 and adapted to have its outer end swinging freely, is a secondary link or lever 6 which in its outer end carries a pin 7 upon which is pivoted the bowed pressure-absorbing spring 8. Rigidly attached to the tongue 1 and in the same plane as the spring 8, is a wedge-shaped lug 9. To adapt the spring 8 to act coöperatively with this lug 9, it is provided on the end with a slightly outwardly-turned portion 10 which permits of a sliding movement on the angular face of said lug. From this description, it will be seen that the spring 8 is adapted to slide along the tongue 1 while at the same time being pressed to the tongue by means of the secondary link 6. It will further be seen that the lug 9 has for its purpose to limit the endwise movement of the spring.

In the extreme end of the primary lever 3 is a hole adapted to receive a large bolt 11 by means of which the main draft or evener bar is attached to the mechanism described above. As shown in dotted lines in the drawings, an evener bar having provision for three horses is pivoted on the bolt 11. Upon one end of the evener bar is carried a double tree bearing two individual whiffletrees while on the other end corresponding to the side upon which lies the plowed ground or field of grain, is attached a swingle tree.

Any suitable number of bolt holes may be provided in the evener bar for varying the point of its attachment, one such hole being shown at 15 a location thereof suitable for the hitching up of four horses.

To provide means for preventing an excessive angular displacement of the primary lever 3 about its pivot 2, a pair of auxiliary links 13 and 14 are used to connect the drawbolt 11 to a pin 16 carried by the tongue.

While I have shown in the drawings only one adaptation of my invention, I do not wish to be limited to the exact construction shown, as it is very evident that various modifications might be made therein without departing from the spirit of my invention.

Having thus described my invention, the following is what I claim as new and desire to secure by Letters Patent:

1. A draft-equalizer comprising a tongue, a primary lever pivoted thereon, a secondary lever pivotally attached thereto at one of its ends, a double bowed spring carried by the other end of the secondary lever in such manner as to adapt it to slide longitudinally along the tongue and to be impinged upon by one end of the primary lever, a lug carried by the tongue to limit the longitudinal movement of the slidable spring, and means residing in the other end of said primary lever whereby the main draw-bar may be attached to the primary lever at varying distances from the tongue.

2. A draft-equalizer comprising a tongue, a primary lever having long and short arms pivoted thereto, adjustable means carried by the long arm for attaching the main draw-bar thereto, a pair of auxiliary links also attached to the long arm and to the tongue whereby the swing of the primary lever is limited, a secondary lever pivotally movable about the pivot of the primary lever, a double bowed spring pivotally mounted in the outer end of the secondary lever in such manner as to hold the spring against the tongue while permitting a sliding movement therealong, and a lug carried by the tongue for limiting the rearward movement of the spring.

3. A draft-equalizer comprising a primary lever adapted for pivotal connection to the tongue of a farm implement in such manner as to provide long and short arms thereto; a pressure-absorbing spring slidable longitudinally on the tongue and adapted to be impinged upon by the short arm of the primary lever, a secondary lever pivoted at one end to the tongue and retaining said pressure-absorbing spring by a pivot in the other end thereof; and an adjustable means carried by the long arm of said primary lever whereby an evener-bar may be connected on to said primary lever.

4. A draft-equalizer comprising a primary link lever adapted for pivotal connection to the tongue of a farm implement in such manner as to provide long and short arms thereto, a pressure-absorbing spring slidable longitudinally upon the tongue, a secondary link-member pivoted at one end to the tongue and at its other end to the pressure-absorbing spring whereby the said spring is retained in slidable connection with the tongue and adapted to be impinged upon by the shorter end of the said primary link-lever.

In testimony whereof he affixes his signature, in presence of two witnesses.

FRANKLIN G. ALVORD.

Witnesses:
    A. L. FEATHER,
    D. H. POWERS.